US009988064B2

(12) United States Patent
Liao

(10) Patent No.: US 9,988,064 B2
(45) Date of Patent: Jun. 5, 2018

(54) BABY STROLLER

(71) Applicant: UNIQUE PRODUCT & DESIGN CO., LTD., Tainan (TW)

(72) Inventor: Tsoung-Yong Liao, Tainan (TW)

(73) Assignee: Unique Product & Design Co., Ltd., Tainan (TW)

( * ) Notice: Subject to any disclaimer, the term of this patent is extended or adjusted under 35 U.S.C. 154(b) by 0 days. days.

(21) Appl. No.: 15/389,548

(22) Filed: Dec. 23, 2016

(65) Prior Publication Data

US 2017/0183024 A1    Jun. 29, 2017

(30) Foreign Application Priority Data

Dec. 24, 2015   (TW) .............................. 104220678 U

(51) Int. Cl.
| B62B 7/06 | (2006.01) |
| B62B 7/10 | (2006.01) |
| B62B 9/20 | (2006.01) |
| B62B 7/00 | (2006.01) |

(52) U.S. Cl.
CPC ................ B62B 7/10 (2013.01); B62B 7/002 (2013.01); B62B 9/20 (2013.01); B62B 2205/00 (2013.01)

(58) Field of Classification Search
CPC .. B62B 7/10; B62B 7/002; B62B 9/20; B62B 2205/20; B62B 7/062; B62B 7/068; B62B 7/086
See application file for complete search history.

(56) References Cited

U.S. PATENT DOCUMENTS

| 7,591,479 B2 * | 9/2009 | Golias ....................... B62B 3/12 280/47.38 |
| 7,862,053 B2 * | 1/2011 | Liao .......................... B62B 3/02 280/38 |
| 7,922,182 B2 * | 4/2011 | Van Der Vegt ......... B62B 7/068 188/20 |
| 8,720,912 B2 * | 5/2014 | Liao .......................... B62B 3/12 280/47.24 |

(Continued)

FOREIGN PATENT DOCUMENTS

| WO | WO-2006116900 A1 * | 11/2006 | ............. B62B 7/068 |
| WO | 2007071141 A1 | 6/2007 | |

(Continued)

OTHER PUBLICATIONS

Search Report of corresponding EPO application, dated May 24, 2017.

*Primary Examiner* — James A Shriver, II
*Assistant Examiner* — Steve Clemmons
(74) *Attorney, Agent, or Firm* — Wang Law Firm, Inc.

(57) ABSTRACT

Provided herein is a baby stroller, which has an expanded mode and a folded mode, and includes a lower arm set, a connection part, a front wheel frame, a slide block, a rear wheel set, an upper frame, a first link rod set, a handling tube, a supporting rod set, two seat supports, and two second link rods. Due to the couplings between the slide block, the handling tube and the upper frame and the coupling between the slide block and the rear wheel rocker arms, the baby stroller may easily be folded so that it occupies considerably less space, and thereby improve its portability and facilitate its stowage and transportation.

6 Claims, 10 Drawing Sheets

(56) References Cited

U.S. PATENT DOCUMENTS

| | | | | |
|---|---|---|---|---|
| 8,820,775 B2 * | 9/2014 | Wang | ................... | B62B 5/0433 |
| | | | | 280/42 |
| 8,820,776 B2 * | 9/2014 | Wang | ................... | A63L 355/08 |
| | | | | 280/641 |
| 9,004,505 B1 * | 4/2015 | Wu | ........................ | B62B 3/022 |
| | | | | 280/38 |
| 9,079,598 B1 * | 7/2015 | Oreyang | ................ | B62B 3/022 |
| 2004/0075247 A1 | 4/2004 | Lin | | |
| 2008/0211206 A1 * | 9/2008 | Thorne | ................... | B62B 7/068 |
| | | | | 280/650 |
| 2010/0059948 A1 | 3/2010 | Liao | | |

FOREIGN PATENT DOCUMENTS

| | | | | |
|---|---|---|---|---|
| WO | WO-2007071141 A1 * | 6/2007 | ............. | B62B 7/068 |
| WO | WO-2012094955 A1 * | 7/2012 | ............... | B62B 3/02 |

* cited by examiner

BABY STROLLER

CROSS-REFERENCE TO RELATED APPLICATION

This application claims priority from Taiwan Patent Application No. 104220678, filed on Dec. 24, 2015 at the Taiwan Intellectual Property Office, the content of which is hereby incorporated by reference in its entirety for all purposes.

BACKGROUND OF THE INVENTION

1. Field of the Invention

The present invention relates to a baby stroller, and in particular relates to a structure with coupled components for a folding baby stroller.

2. Description of the Related Art

With modern busy lifestyles, even after giving birth, people still want to go out and about, and often would like to take their young baby children with them, or have to if they are unable to have a babysitter take care of their children. An aid to carry a baby, such as a baby stroller that is able to carry a baby while the parents or other child carers are outside and so lighten their burden, is extremely helpful in any case, or even indispensable for those with modern busy lifestyles.

Aside from when the baby stroller is in use with a baby inside, a baby stroller has to be carried from time to time. When moving the baby stroller from one place to another, being able to fold a baby stroller into a more compact shape is extremely helpful to facilitate its portability. To enable to the baby stroller to fold into a more compact shape, most conventional implementations use joints and in other implementations components have to be disassembled. A structure of a baby stroller that may easily be folded without disassembling any component would more convenient and easier to use.

SUMMARY OF THE INVENTION

In view of the aforementioned issue of a conventional implementation of a baby stroller, the purpose of the present invention is to provide a baby stroller with slide block and couplings between components to enable the baby stroller to fold into a shape occupying considerably less space for easier transportation.

The present invention provides a baby stroller, which has an expanded mode and a folded mode. The baby stroller includes a lower arm set, a connection part, a front wheel frame, a slide block, a rear wheel set, an upper frame, a first link rod set, a handling tube, a supporting rod set, two seat supports, and two second link rods. One end of the lower arm set is connected to the connection part and the other end is connected to the front wheel frame. At least one front wheel is disposed on the front wheel frame. The slide block is disposed on the lower arm set and is actuated to slide forward and backward along the lower arm set. The rear wheel set is connected to two sides of the connection part and two sides of the slide block. One end of the upper frame is pivotally connected to the connection part. One end of the first link rod set is pivotally connected to the slide block, and a point between the ends of the first link rod set is pivotally connected to a point between the ends of the upper frame. One end of the handling tube is pivotally connected to the other end of the upper frame. One end of the supporting rod set is pivotally connected the other end of the first link rod set, and the other end of the supporting rod set is pivotally connected to the handling tube. One end of each of the two seat supports are pivotally connected to the two sides of the connection part respectively. One end of each of the two second link rods are pivotally connected to the two sides of the slide block respectively and the other end of each of the two second link rods are individually and pivotally connected to the two seat supports. The slide block is adjacent to the connection part in the expanded mode and is adjacent to the front wheel frame in the folded mode. The angle between the upper frame and the lower arm set is greater in the expanded mode than in the folded mode. The angle between the supporting rod set and the first link rod set is greater in the expanded mode than in the folded mode. The angle between the rear wheel frame and the lower arm set is greater in the expanded mode than in the folded mode. The angle between the two seat supports and the lower arm set is greater in the expanded mode than in the folded mode.

Preferably, the rear wheel set includes two pull rods and two rear wheel rocker arms. One end of each of the two pull rods are individually and pivotally connected to the two sides of the slide block and one end of each of the two rear wheel rocker arms are individually and pivotally connected to the two sides of the connection part. The other end of each of the two pull rods are individually and pivotally connected to the two rear wheel rocker arms and the other end of each rear wheel rocker arm is disposed with a rear wheel.

Preferably, the rear wheel set includes two pull rods and two rear wheel rocker arms. One end of each of the two rear wheel rocker arms are individually and pivotally connected to the two sides of the slide block, and one end of each of the two pull rods are individually and pivotally connected to the two sides of the connection part. The other end of each of the two pull rods are individually and pivotally connected to the two rear wheel rocker arms, and the other end of each rear wheel rocker arm is disposed with a rear wheel.

Preferably, while transforming from the expanded mode to the folded mode, an external force simultaneously causes the handling tube to rotate away from the front wheel frame and move downward toward the lower arm set causing the upper frame and the supporting rod set to rotate toward the front wheel frame, and while transforming from the folded mode to the expanded mode, another external force may simultaneously cause the handling tube to rotate upward away from the lower arm set and to move towards the upper side of the lower arm set causing the upper frame and the supporting rod set to rotate upward away from the lower arm set.

Preferably, while transforming from the expanded mode to the folded mode, the upper frame rotates toward the front wheel frame causing the first link rod set to push the slide block to slide toward the front wheel frame, and while transforming from the folded mode to the expanded mode, the upper frame may rotate upward away from the lower arm set causing the first link rod set to pull the slide block to slide toward the connection part.

Preferably, while transforming from the expanded mode to the folded mode, the slide block slides toward the front wheel frame pulling the two pull rods, which cause the two rear wheel rocker arms to rotate toward the lower arm set, and while transforming from the folded mode to the expanded mode, the slide block slides toward the connection part pushing the two pull rods, which cause the two rear wheel rocker arms to rotate away from the lower arm set.

Preferably, while transforming from the expanded mode to the folded mode, the slide block slides toward the front wheel frame pulling the two rear wheel rocker arms causing the two rear wheel rocker arms to be pulled by the two pull rods and consequently the two rear wheel rocker arms to rotate toward the lower arm set, and while transforming from the folded mode to the expanded mode, the slide block slides toward the connection part pushing the two rear wheel rocker arms and causing the two rear wheel rocker arms to be pulled by the two pull rods and consequently the two rear wheel rocker arms to rotate away from the lower arm set.

Preferably, while transforming from the expanded mode to the folded mode, the slide block slides toward the front wheel frame pulling two second link rods causing the two second link rods to pull the two seat supports so that the two seat supports rotate toward the lower arm set, and while transforming from the folded mode to the expanded mode, the slide block slides toward the connection part pushing the two second link rods causing the two second link rods to push the two seat supports so that the two seat supports rotate away from the lower arm set.

Preferably, an elastic element is disposed between each rear wheel rocker arm and the rear wheel.

Preferably, the baby stroller further includes a soft structure, which is disposed on the baby stroller.

Due to the couplings between the slide block, the handling tube and the upper frame and the coupling between the slide block and the rear wheel rocker arm, the baby stroller of the present invention may easily be folded so that it occupies considerably less space and thereby improve its portability and facilitate its stowage and transportation.

DESCRIPTION OF THE PREFERRED EMBODIMENTS

Figure 1:
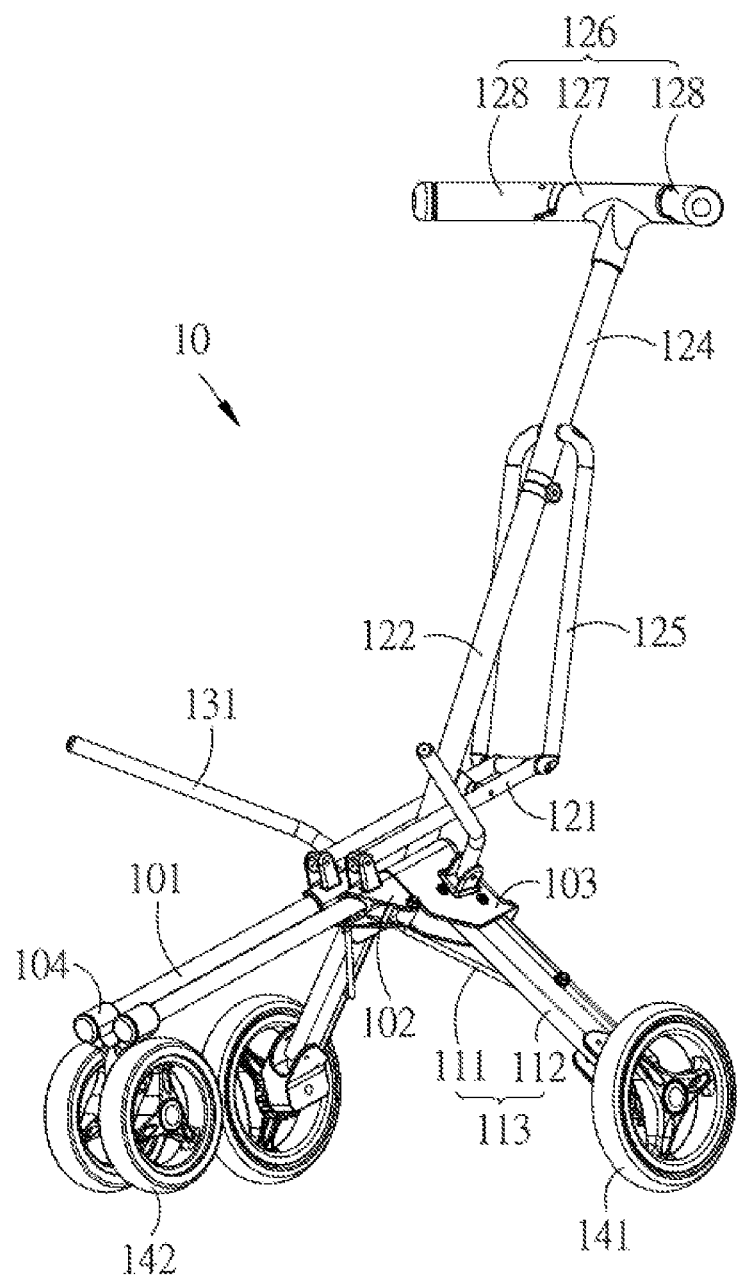
FIG. 1 is a schematic diagram showing the first embodiment of a baby stroller of the present invention in the expanded mode.
Figure 2:
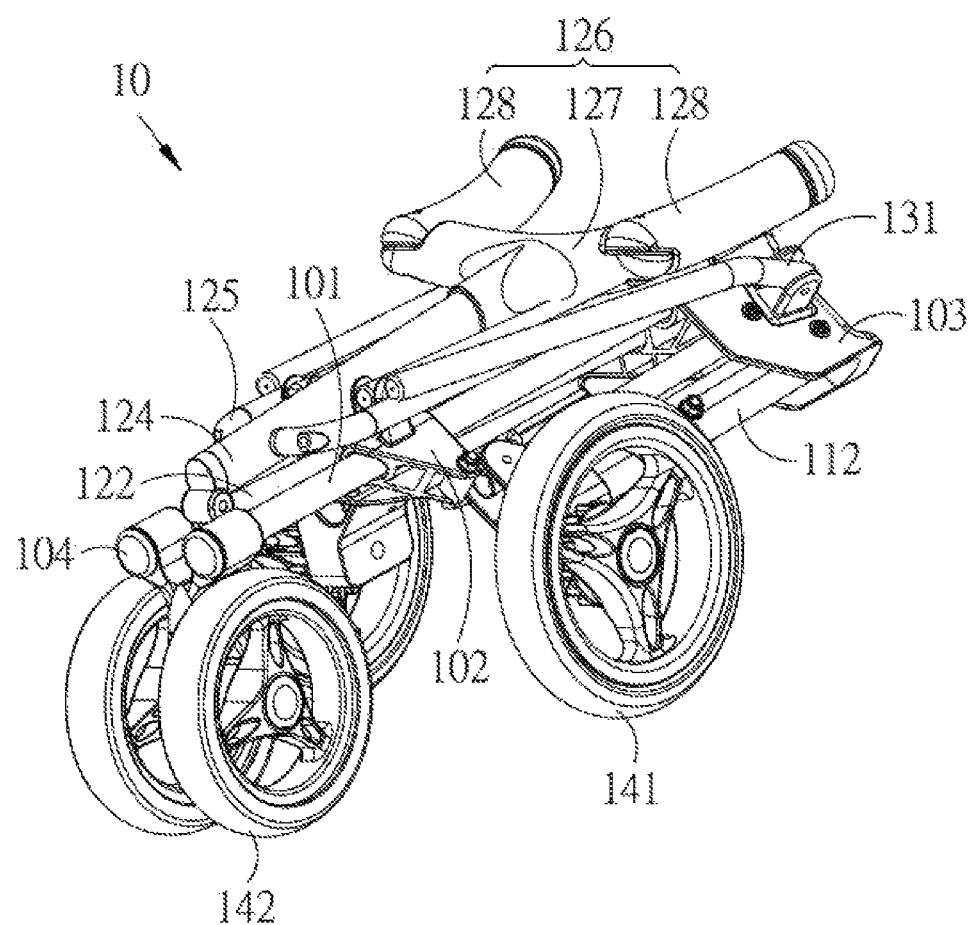
FIG. 2 is a schematic diagram showing the first embodiment of a baby stroller of the present invention in the folded mode.

The following refers to FIGS. 1 and 2, where FIG. 1 is a schematic diagram showing the first embodiment of a baby stroller of the present invention in the expanded mode, and FIG. 2 is a schematic diagram showing the first embodiment of a baby stroller of the present invention in the folded mode. As shown in the figures, the first embodiment of the baby stroller 10 of the present invention has an expanded mode and a folded mode, and includes a lower arm set 101, a connection part 103, a front wheel frame 104, a slide block 102, a rear wheel set 113, an upper frame 122, a first link rod set 121, a handling tube 124, a supporting rod set 125, and two seat supports 131.

One end of the lower arm set 101 is connected to the connection part 103 and the other end is connected to the front wheel frame 104. At least one front wheel 142 is disposed on the front wheel frame 104. The lower arm set 101 includes a preset interval, which may be adjusted according to design requirements. The slide block 102 is disposed on the lower arm set 101 and may be actuated to move along the lower arm set 101. More specifically, the slide block 102 is disposed on and may move along the lower arm 101 between the connection part 103 and the front wheel frame 104.

The rear wheel set 113 is connected to both sides of the connection part 103 and both sides of the slide block 102, and includes two pull rods 111 and two rear wheel rocker arms 112. One end of each of the two pull rods 111 are individually and pivotally connected to two sides of the slide block 102. One end of each of the two rear wheel rocker arms 112 are individually and pivotally connected to two sides of the connection part 103. The other end of each of the two pull rods 111 are individually and pivotally connected to suitable locations on the two rear wheel rocker arms 112. The pivotal joint between the rear wheel rocker arm 112 and the connection part 103 is located on a sloped surface, which is inclined at an angle to a plane of the lower arm set 101. Then, when rotating about the pivotal joint with the connection part 103 toward the lower arm set 101, the two rear wheel rocker arms 112 rotate along the sloped surfaces moving upward closer to the lower arm set 101 and closer to one another. The other end of each rear wheel rocker arm 112 is disposed with a rear wheel 141.

One end of the upper frame 122 is pivotally connected to the connection part 103. One end of the first link rod set 121 is pivotally connected to the slide block 102. A point between the ends of the first link rod set 121 is pivotally connected to a point between the ends of the upper frame 122. In other words, the upper frame 122 and the first link rod set 121 cross each other and are pivotally connected at a suitable point, such that the two are interconnected and mutually drawn by one another.

One end of the handling tube 124 is pivotally connected to the other end of the upper frame 122. One end of the supporting rod set 125 is pivotally connected to the other end of the first link rod set 121, and the other end of the supporting rod set 125 is pivotally connected to a suitable location on the handling tube 124. One end of each of the two seat supports 131 are individually and pivotally connected to the two sides of the connection part 103.

Figure 3A:
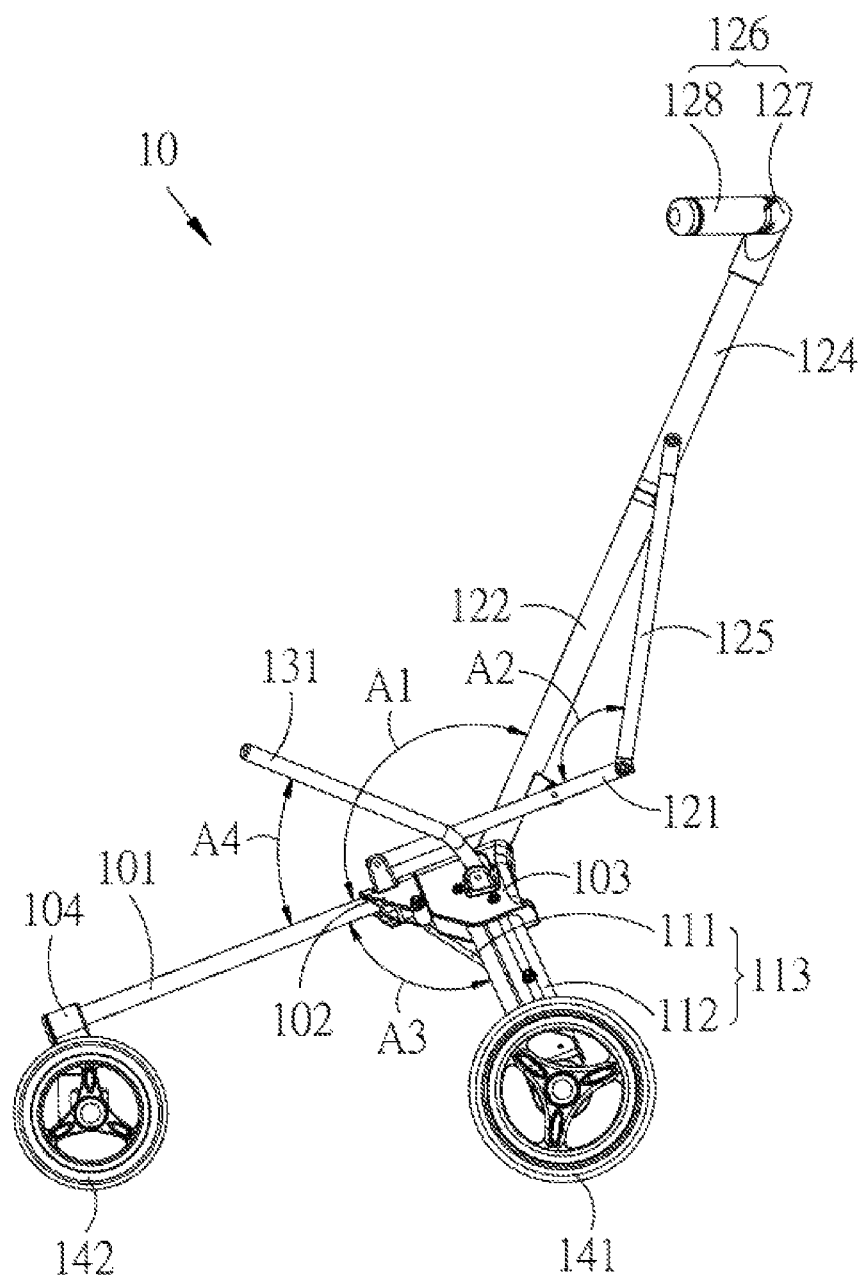
FIGS. 3A-3C are schematic diagrams each showing a stage in the transformation from the expanded mode to the folded mode of the first embodiment of a baby stroller of the present invention.

While transforming to the expanded mode, the slide block 102 moves closer to the connection part 103. While transforming to the folded mode, the slide block 102 moves closer to the front wheel frame 104. The handling tube 124 and the upper frame 122 are linearly aligned in the expanded mode. When transforming to the folded mode, the handling tube 124 and the upper frame 122 rotate about the pivotal joint between them until the two are superimposed over one another. The angle A1 between the upper frame 122 and the lower arm set 101 is greater in the expanded mode than in the folded mode, as shown in FIG. 3A. Additionally, in the folded mode, the upper frame 122 may be located in between the lower arm set 101. More specifically, the connection part 103 and the slide block 102 are shaped in design such that the upper frame 122 is able to rotate about the pivotal joint with the lower arm set 101 to its folded position in between the lower arm set 101, and the occupying space of the baby stroller 10 is reduced.

Figure 3B:
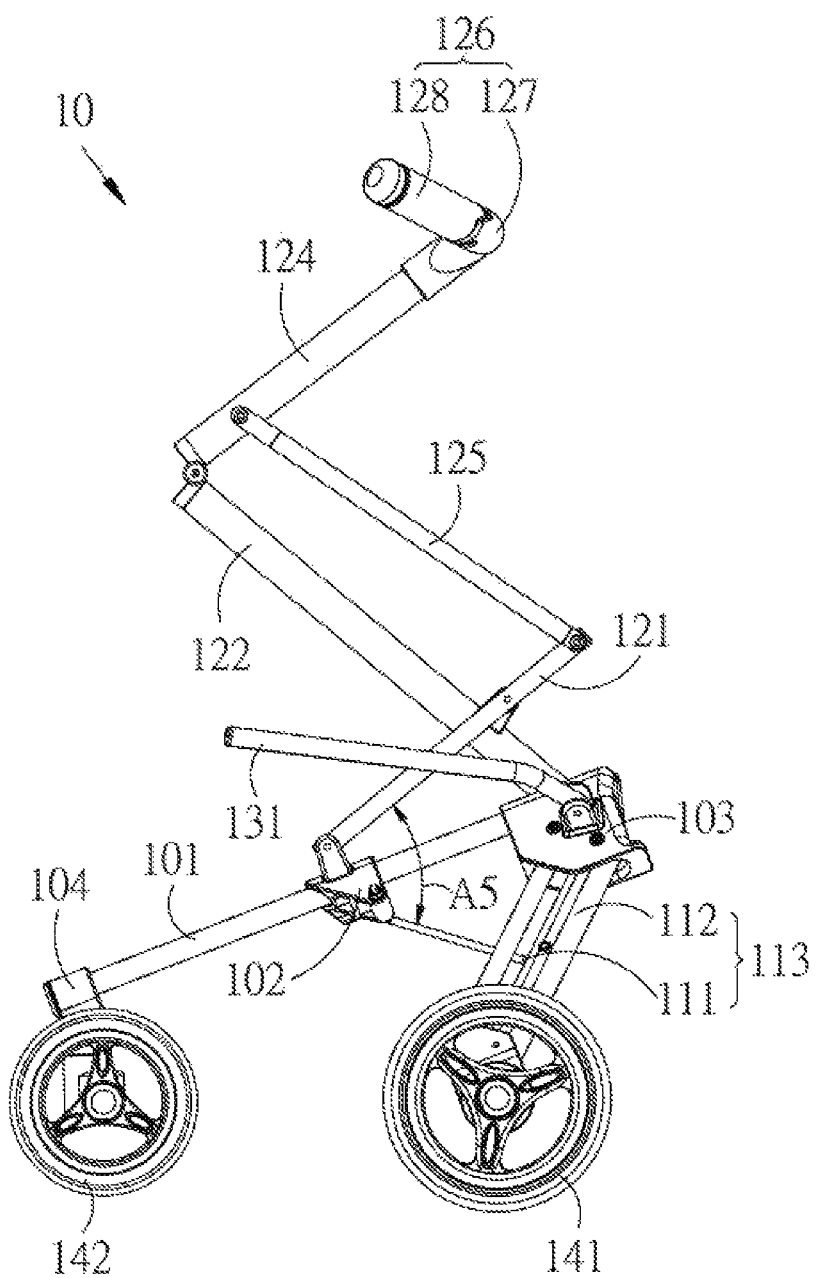

Furthermore, the angle A2 between the supporting rod set 125 and the first link rod set 121 is greater in the expanded mode than in the folded mode, as shown in FIG. 3A. The interval of the supporting rod set 125 is larger than the interval of the first link rod set 121, such that when transforming to the folded mode, the supporting rod set 125 rotates about the pivotal joint with the first link rod set 121 toward the first link rod set 121 until the supporting rod set 125 is partially in the same plane as the first link rod set 121. The angle A3 between the rear wheel set 113 and the lower arm set 101 is greater in the expanded mode than in the folded mode, as shown in FIG. 3A. In other words, when transforming to the folded mode, the rear wheel rocker arm 112 moves closer to the lower arm set 101 in order to reduce the space occupied by the baby stroller 10. The angle A4 between the two seat supports 131 and the lower arm set 101 is greater in the expanded mode than in the folded mode, as shown in FIG. 3A. Similarly, when transforming to the folded mode, the seat support 131 gets closer to the lower arm set 101 to reduce the space occupied by the baby stroller 10. The angle A5 between the first link rod set 121 and the two pull rods 111 is greater in the expanded mode than in the folded mode, as shown in FIG. 3B. In other words, while transforming to the folded mode, both the first link rod set 121 and the pull rod 111 get closer to the lower arm set 101, such that the angle A5 decreases.

As mentioned above, the baby stroller 10 of the present invention has its configuration fixed in the expanded mode to meet the conventional usage requirements, and then when transforming to the folded mode, each component of the baby stroller moves to its folded position to improve its portability and facilitate its stowage and transportation.

Figure 3C:
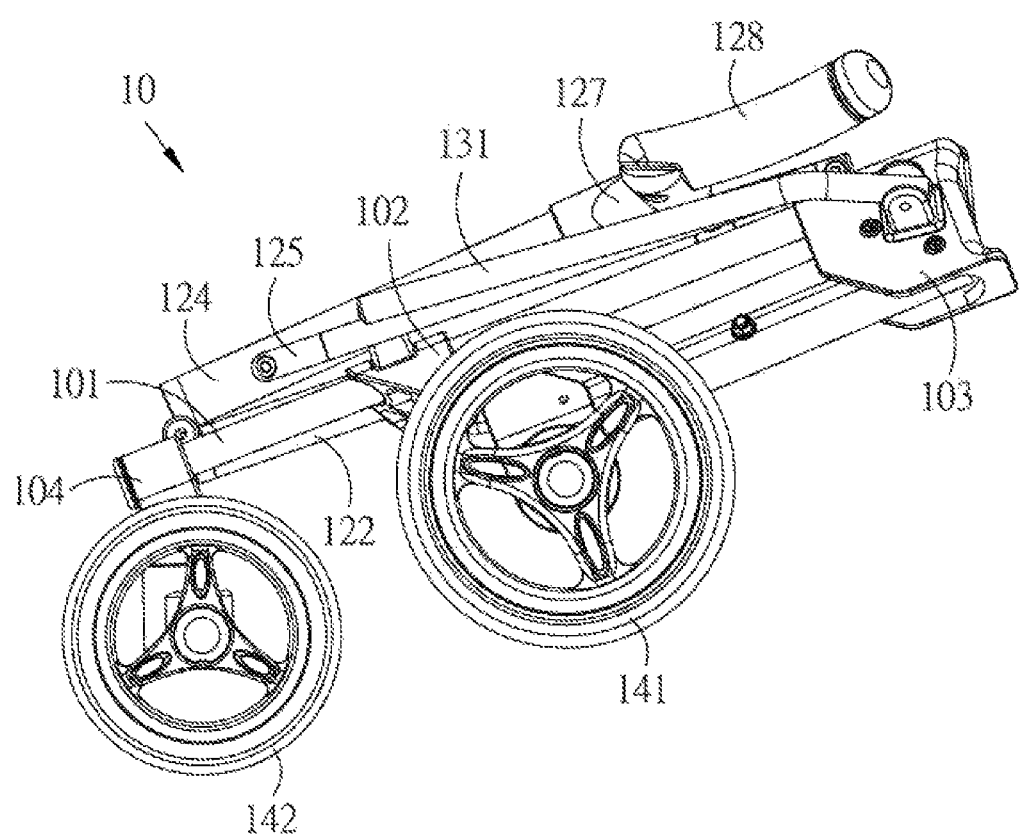

The following refers to FIGS. 3A-3C, which are schematic diagrams each showing a stage in the transformation from the expanded mode to the folded mode of the first embodiment of a baby stroller of the present invention. As shown in the figures, while transforming from the expanded mode to the folded mode, an external force causes the handling tube 124 to rotate backward toward the back of the baby stroller 10 and away from the front wheel frame 103 about the pivotal joint with the upper frame 122 and move down toward the lower arm set 101. The movement of the handling tube 124 actuates the upper frame 122 and the supporting rod set 125, which are pivotally connected to the handling tube 124, to rotate toward the front wheel frame 104. In this way, the upper frame 122 and the supporting rod set 125 get closer to the lower arm set 101.

On the other hand, while transforming from the folded mode to the expanded mode, another external force causes the handling tube 124 to rotate forward toward the front of the baby stroller 10 and upward away from the lower arm set 101 about the pivotal joint with the upper frame 122 and also to move towards the upper side of the lower arm set 101. In this way, the upper frame 122 and the supporting rod set 125 are actuated to rotate upward away from the lower arm set 101.

Also, while transforming from the expanded mode to the folded mode, the upper frame 122 rotates about the pivotal joint with the connection part 103 toward the front wheel frame 104. Due to being pivotally connected with the first link rod set 121, the forward rotation of the upper frame 122 actuates the first link rod set 121 to move. Consequently, the first link rod set 121 pushes the slide block 102 to slide toward the front wheel frame 104.

On the other hand, while transforming from the folded mode to the expanded mode, the upper frame 122 rotates about the pivotal joint with the connection part 103 backward toward the back of the baby stroller 10 and upward away from the lower arm set 101, which actuates the first link rod set 121 to pull the slide block 102 to slide toward the connection part 103.

Moreover, while transforming from the expanded mode to the folded mode, the slide block 102 slides toward the front wheel frame 104 pulling the two pull rods 111. The movement of the two pull rods 111 actuates the two rear wheel rocker arms 112 to rotate about the pivotal joint with the connection part 103 up toward the lower arm set 101.

On the other hand, while transforming from the folded mode to the expanded mode, the slide block 102 slides toward the connection part 103 pushing the two pull rods 111. The movement of the two pull rods 111 actuates the two rear wheel rocker arms 112 to rotate about the pivotal joint with the connection part 103 down and away from the lower arm set 101.

Furthermore, while transforming from the expanded mode to the folded mode, an external force causes the two seat supports 131 to rotate about the pivotal joint with the connection part 103 closer toward the lower arm set 101. While transforming from folded mode to the expanded mode, another external force causes the two seat supports 131 to rotate about the pivotal joint with the connection part 103 away from the lower arm set 101.

In particular, the first embodiment of the baby stroller 10 of the present invention may further include two second link rods (not shown in the figures). One end of each of the two second link rods are individually and pivotally connected to the two sides of the slide block 102, and the other ends are individually and pivotally connected to suitable locations on the two seat supports 131. Thus, when the slide block 102 is sliding, the seat support 131 may be actuated by the second link rod without the need to exert another force on the seat support 131.

The transformation procedure from the expanded mode to the folded mode is briefly summarized as follows. In order to transform the baby stroller 10 of the present invention from the expanded mode to the folded mode, a user may push the handling tube 124 forward and downward to cause the linearly aligned handling tube 124 and upper frame 122 to bend at the pivotal joint. The handling tube 124 rotates backward and the upper frame 122 rotates forward. Both handling tube 124 and upper frame 122 get closer to the lower arm set 101 and ultimately are superimposed over one another with the upper frame 122 located between the lower arm set 101. The movement of the upper frame 122 actuates the first link rod set 121 to push the slide block 102, which then slides toward the front wheel frame 104. The movement of the slide block 102 then actuates the rear wheel rocker arm 112 to move up closer to the lower arm set 101. Finally, the seat support 131 is pushed to rotate to ultimately lie against the lower arm set 101. In this way, the baby stroller 10 of the present invention may be collapsed to its folded mode so that it occupies considerably less space.

Moreover, the baby stroller 10 may further include a handle 126, which is disposed on the other end of the handling tube 124. The handle 126 includes a fixed part 127 and two gripping parts 128. The two gripping parts 128, which are shaped for holding, are pivotally connected to two sides of the fixed part 127. In the expanded mode, the handle 126 is in the shape of an arc. While transforming from the expanded mode to the folded mode, the two gripping parts 128 rotate away from the front wheel frame 104, such that the two gripping parts 128 do not extend from the sides. While transforming from the folded mode to the expanded mode, the two gripping parts 128 rotate toward the front wheel frame 104 to their extended positions.

An elastic element may be disposed between each rear wheel rocker arm 112 and rear wheel 141 (not shown in the figures). The elastic element may be, but is not limited to, a spring or any other elastic structure. The elastic element in the baby stroller 10 of the present invention serves as a buffer to absorb and damp shock impulses caused when pushing the baby stroller 10 over uneven ground, and thereby provides a more comfortable ride for a baby in the baby stroller 10.

It should be noted that an additional soft structure may also be included and disposed in the baby stroller 10 of the present invention. The soft structure may provide a seat for a baby, a carrier for objects, and a roof as a sunshade in order to meet other functional requirements of a baby stroller.

Figure 4:
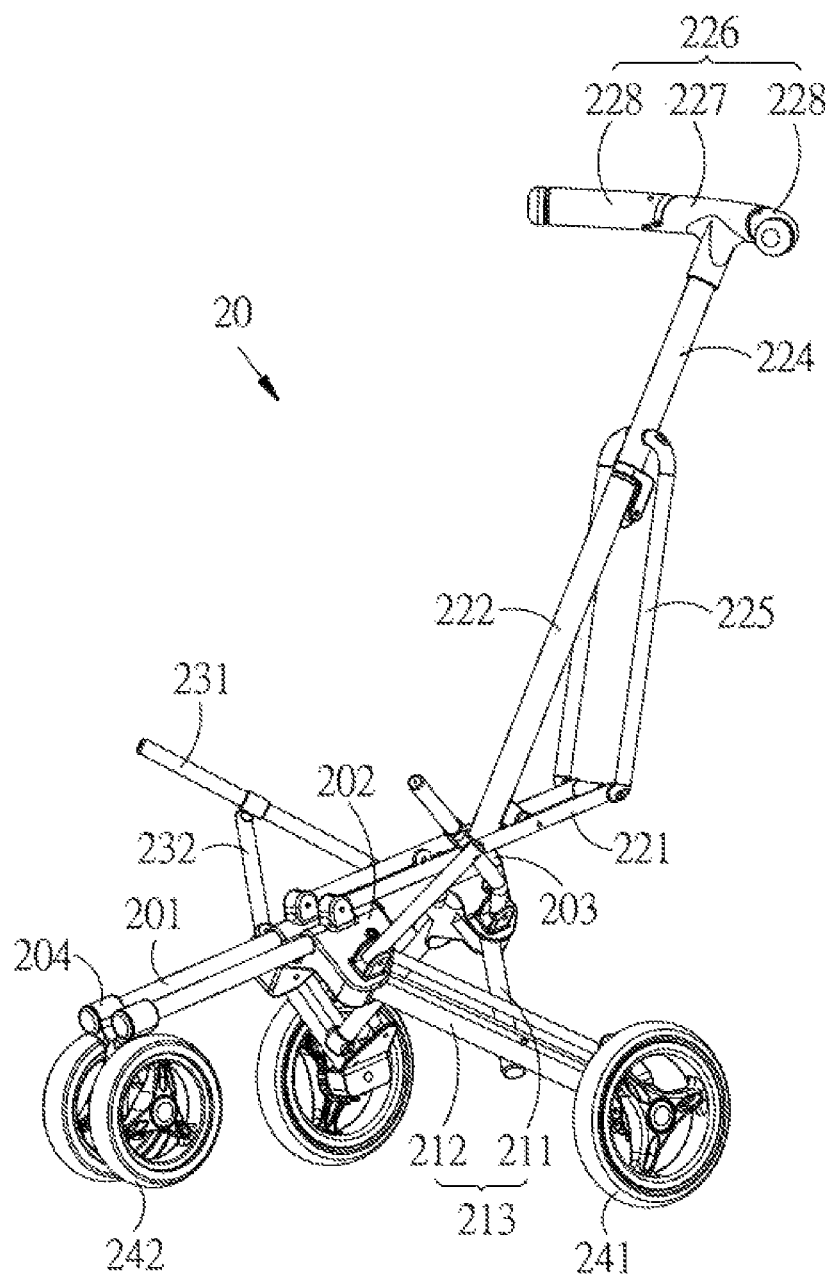
FIG. 4 is a schematic diagram showing the second embodiment of a baby stroller of the present invention in the expanded mode.
Figure 5:
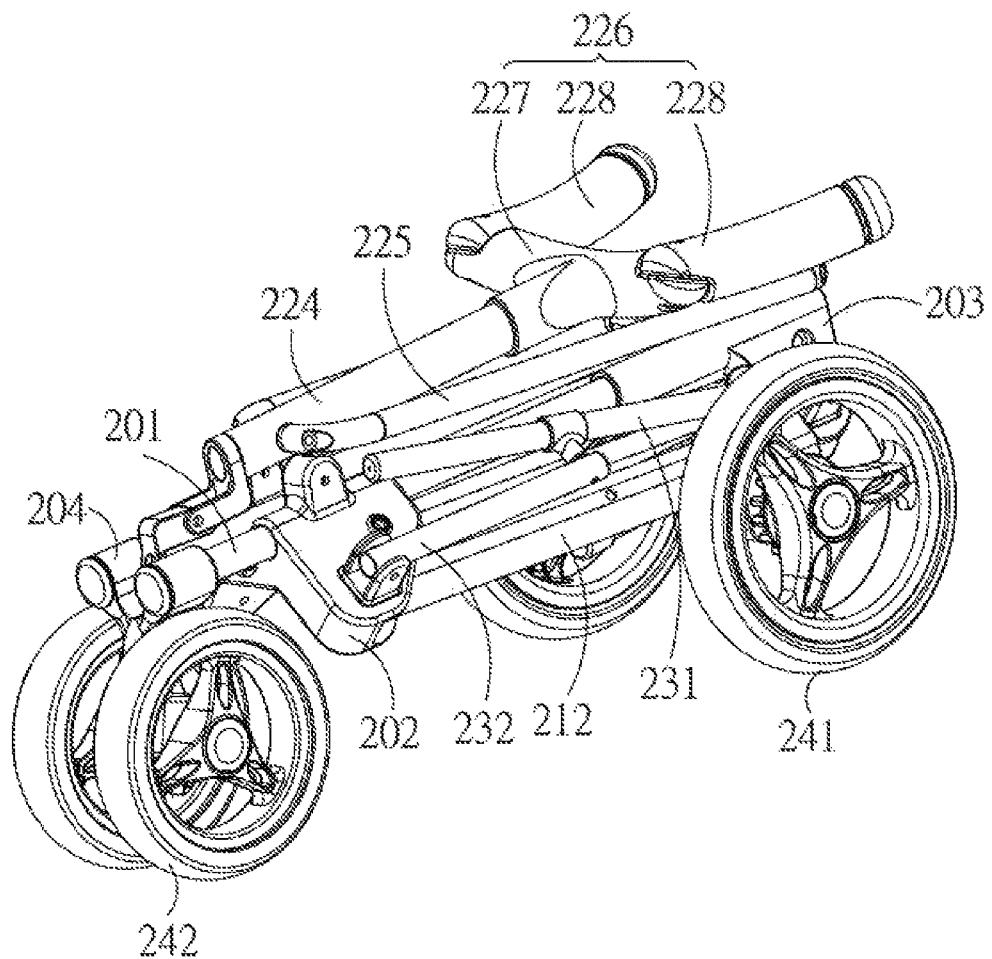
FIG. 5 is a schematic diagram showing the second embodiment of a baby stroller of the present invention in the folded mode.

The following refers to FIGS. 4 and 5, where FIG. 4 is a schematic diagram showing the second embodiment of a baby stroller of the present invention in the expanded mode, and FIG. 5 is a schematic diagram showing the second embodiment of a baby stroller of the present invention in the folded mode. As shown in the figures, the second embodiment of the baby stroller 20 of the present invention also has an expanded mode and a folded mode and also includes a lower arm set 201, a connection part 203, a front wheel frame 204, a slide block 202, a rear wheel set 213, an upper frame 222, a first link rod set 221, a handling tube 224, a supporting rod set 225, and two seat supports 231. The rear wheel set 213 of the second embodiment also includes two pull rods 211 and two rear wheel rocker arms 212. However, in the second embodiment, the locations of the two pull rods 211 and the locations of the two rear wheel rocker arms 212 are switched relative to their locations in the first embodiment. Furthermore, the second embodiment of the baby stroller 20 of the present invention has additional two second link rods 232 disposed between the slide block 202 and the two seat supports 231.

Equivalent characteristics between the first and the second embodiments are omitted for conciseness, with only the differences detailed hereinafter. In the second embodiment, the locations of the two pull rods 211 and the two rear wheel rocker arms 212 included in the rear wheel set 213 are different from those in the first embodiment. One end of each of the two rear wheel rocker arms 212 are individually and pivotally connected to the two sides of the slide block 202. One end of each of the two pull rods 211 are individually and pivotally connected to the two sides of the connection part 203. The other end of each of the two pull rods 221 are individually and pivotally connected to suitable locations on the two rear wheel rocker arms 212. In other words, in the second embodiment, the locations of the two pull rods 211 and the locations of the two rear wheel rocker arms 212 are switched relative to their locations in the first embodiment. The surface where the pivotal joint between the rear wheel rocker arm 212 and the slide block 202 is located is inclined at an angle to a plane of the lower arm set 201. Then, when the tow rear wheel rocker arms 212 rotate about the pivotal joint with the slide block 202 up toward the lower arm set 201, the two rear wheel rocker arms 212 get closer to the lower arm set 201 and the two rear wheel rocker arms 212 also get closer to one another.

Moreover, one end of each of the two second link rods 232 are individually and pivotally connected to the two sides of the slide block 202, and the other ends are individually and pivotally connected to suitable locations on the two seat supports 231. Therefore, when sliding, the slide block 202 actuates each of the seat supports 231 through the corresponding second link rods 232, such that no additional external force is required to be applied to the two seat supports 231.

Figure 6A:
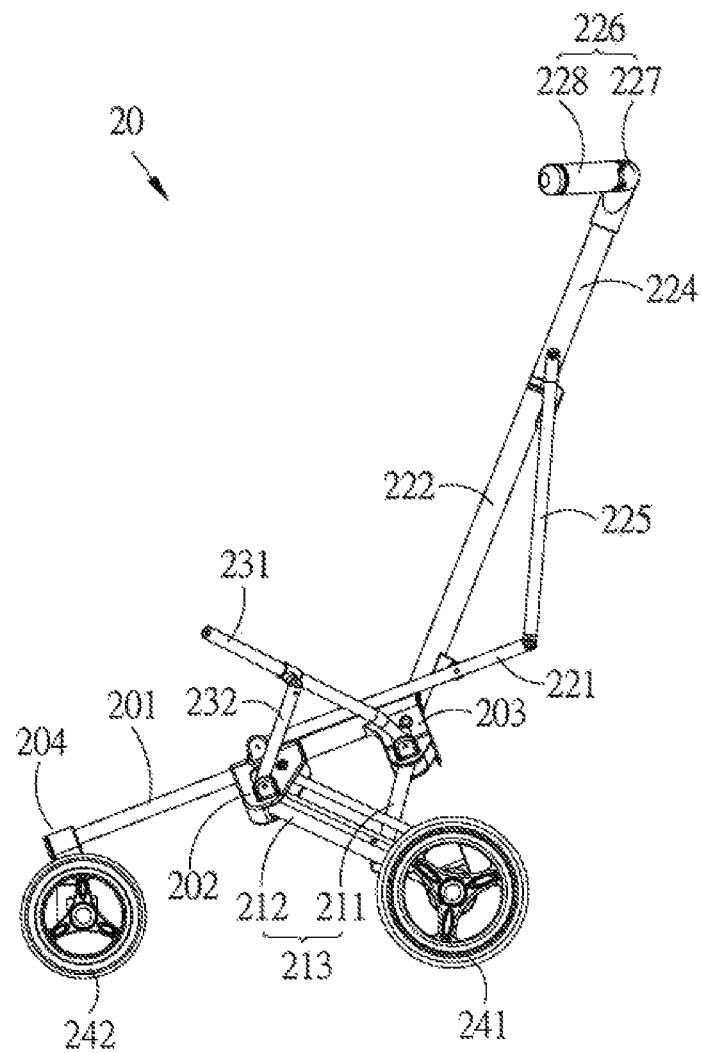
FIGS. 6A-6C are schematic diagrams each showing a stage in the transformation from the expanded mode to the folded mode of the second embodiment of a baby stroller of the present invention.
Figure 6B:
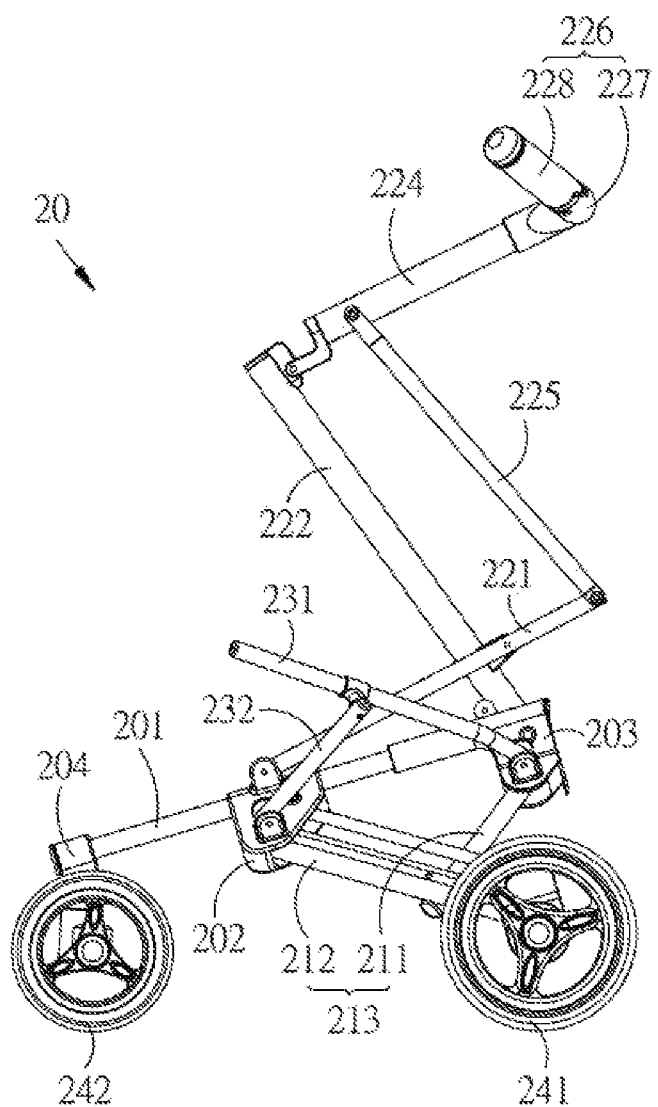
Figure 6C:
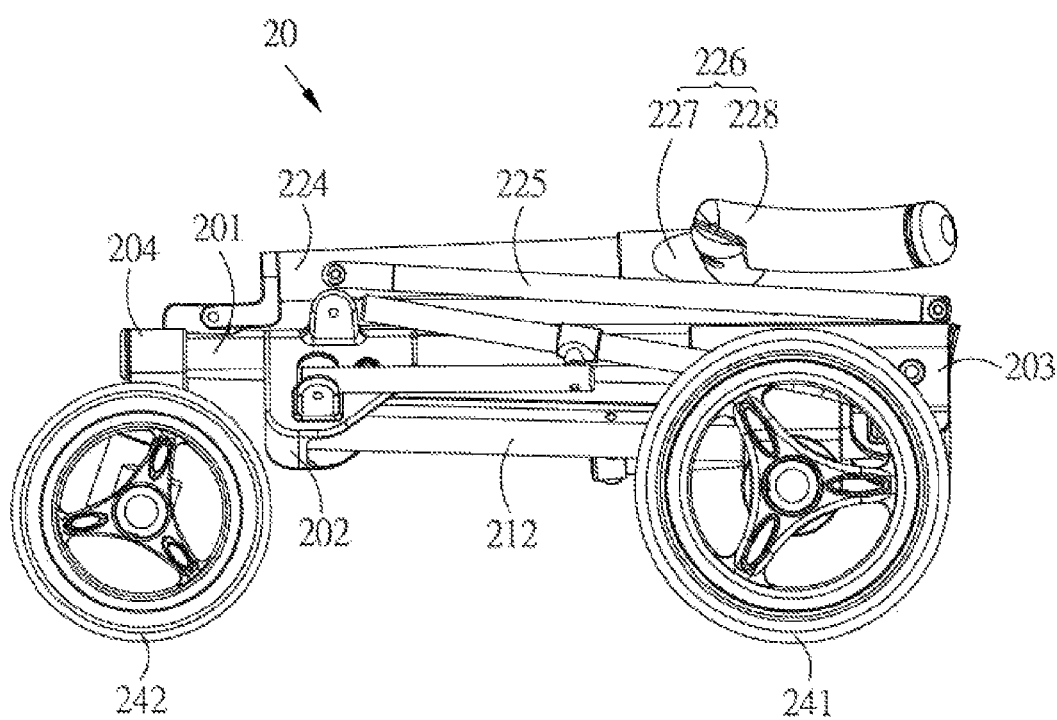

The following refer to FIGS. 6A-6C, which are schematic diagrams each showing a stage in the transformation from the expanded mode to the folded mode of the second embodiment of a baby stroller of the present invention. Except for the differences, which are the relative action of the rear wheel rocker arm 212 and the pull rod 211 included in the rear wheel set 213 and then also the action of the seat support 231, the rest of the second embodiment is equivalent to that in the first embodiment and will not be further described. Only the differences are further detailed hereinafter.

While transforming from the expanded mode to the folded mode, the slide block 202 slides toward the front wheel frame 204 pulling the two rear wheel rocker arms 212. Due to the pivotal connection with the pull rod 211, the two rear wheel rocker arms 212 are each drawn by the corresponding pull rod 211 and rotate about the pivotal connection with the slide block 202 up closer toward the lower arm set 201.

On the other hand, while transforming from the folded mode to the expanded mode, the slide block 202 slides toward the connection part 203 and pushes the two rear wheel rocker arms 212. The two rear wheel rocker arms 212 are each also drawn by the corresponding pull rod 211 and rotate about the pivotal connection with the slide block 202 downward away from the lower arm set 201.

Moreover, while transforming from the expanded mode to the folded mode, the slide block 202 slides toward the front wheel frame 204 pulling the two second link rods 232, each actuating the corresponding seat support 231 to rotate about the pivotal joint with the connection part 203 closer toward the lower arm set 201. While transforming from the folded mode to the expanded mode, the slide block 202 slides toward the connection part 203 pushing the two second link rods 232, each actuating the corresponding seat support 231 to rotate about the pivotal joint with the connection part 203 away from the lower arm set 201.

Furthermore, components such as two rear wheels 241, and at least one front wheel 242, a handle 226, an elastic element (not shown in the figures) and a soft structure (not shown in the figures) may also be included in the second embodiment of the baby stroller 20. The handle 226 may also include a fixed part 227 and a gripping part 228. All these components are equally arranged and act in an equivalent manner to those in the first embodiment. Repetition of such detail is therefore omitted.

With the aforementioned mechanism and coupling structure, the first and second embodiments of the baby stroller of the present invention may switch between the expanded mode and the folded mode. Due to the use of the slide block and the coupling of each component, a force applied to the handling tube is all that is required to fold the baby stroller, without the need to disassemble any component. Furthermore, the use of the slide block reduces the need to apply any additional force on any component when folding the baby stroller. Therefore, a user may easily expand or fold the baby stroller in a simple procedure, whenever the user requires.

As mentioned above, due to the couplings between each component, the baby stroller of the present invention may be folded without disassembling any component. Only a force applied to the handling tube is needed to fold the baby stroller to reduce the space occupied, and thereby improve portability and facilitate stowage and transportation.

The description above is for the purpose of illustration only and shall not be interpreted in any way to limit the scope, configuration or applicability of the present invention. Various modifications and equivalent arrangements can be made to the described embodiments without departing from the spirit and scope of the present invention, which is intended to be limited only by the appended claims.

What is claimed is:

1. A baby stroller having an expanded mode and a folded mode, comprising:
    a lower arm set, one end of which is connected to a connection part and the other end of which is connected to a front wheel frame, wherein at least one front wheel is disposed on the front wheel frame and a slide block is disposed on the lower arm set and the slide block is actuated to slide along the lower arm set;
    a rear wheel set, one end of which is connected to the connection part, and other end of which is connected to the slide block;
    an upper frame, one end of which is pivotally connected to the connection part;
    a first link rod set, one end of which is pivotally connected to the slide block, wherein a point between the ends of the first link rod set is pivotally connected to a point between the ends of the upper frame;
    a handling tube, one end of which is pivotally connected to the other end of the upper frame;
    a supporting rod set, one end of which is pivotally connected to the other end of the first link rod set and the other end of which is pivotally connected to the handling tube;
    two seat supports, one end of each being individually and pivotally connected to each of two sides of the connection part, and one opposite end of each being individually supporting a seat; and
    two second link rods, one end of each being individually and pivotally connected to one of two sides of the slide block and the other opposite end of each being individually and pivotally connected to each of the two seat supports between two opposite ends of each of the two seat supports, and the two second link rods being configured without connecting to the upper frame; wherein:
    a location of the slide block is closer to the connection part in the expanded mode and the location of the slide block is closer to the front wheel frame in the folded mode,
    an angle between the upper frame and the lower arm set is greater in the expanded mode than in the folded mode,
    an angle between supporting rod set and the first link rod set is greater in the expanded mode than in the folded mode,
    an angle between the rear wheel set and the lower arm set is greater in the expanded mode than in the folded mode, and
    an angle between each of the two seat supports and the lower arm set is greater in the expanded mode than in the folded mode.

2. The baby stroller of claim 1, wherein the rear wheel set includes two pull rods and two rear wheel rocker arms, wherein:
    one end of each of the two rear wheel rocker arms are individually and pivotally connected to the two sides of the slide block,
    one end of each of the two pull rods are individually and pivotally connected to the two sides of the connection part,
    the other end of each of the two pull rods are individually and pivotally connected to the two rear wheel rocker arms, and
    the other end of each rear wheel rocker arm is disposed with a rear wheel.

3. The baby stroller of claim 2, wherein:
    while transforming from the expanded mode to the folded mode:
    the slide block slides toward the front wheel frame pulling the two rear wheel rocker arms causing the two rear wheel rocker arms to be pulled by the two pull rods and consequently the two rear wheel rocker arms to rotate toward the lower arm set, and
    while transforming from the folded mode to the expanded mode:
    the slide block slides toward the connection part pushing the two rear wheel rocker arms causing the two rear wheel rocker arms to be pulled by two pull rods and consequently the two rear wheel rocker arms to rotate away from the lower arm set.

4. The baby stroller of claim 1, wherein:
    while transforming from the expanded mode to the folded mode, an external force simultaneously causes:
    the handling tube to rotate backward toward the back of the baby stroller and move down toward the lower arm set
    causing the upper frame and the supporting rod set to rotate toward the front wheel frame, and
    while transforming from the folded mode to the expanded mode, another external force simultaneously causes:
    the handling tube to rotate upward away from the lower arm set and to move towards the upper side of the lower arm set
    causing the upper frame and the supporting rod set to rotate upward away from the lower arm set.

5. The baby stroller of claim 1, wherein:
    while transforming from the expanded mode to the folded mode:
    the upper frame rotates toward the front wheel frame
    causing the first link rod set to push the slide block to slide toward the front wheel frame, and
    while transforming from the folded mode to the expanded mode,
    the upper frame rotates upward away from the lower arm set
    causing the first link rod set to pull the slide block to slide toward the connection part.

6. The baby stroller of claim 1, wherein:
    while transforming from the expanded mode to the folded mode:
    the slide block slides toward the front wheel frame pulling the two second link rods causing the two second link rods to pull the two seat supports so that the two seat supports rotate toward the lower arm set, and
    while transforming from the folded mode to the expanded mode:
    the slide block slides toward the connection part pushing the two second link rods causing the two second link rods to push the two seat supports so that the two seat supports rotate away from the lower arm set.

* * * * *